(12) United States Patent
Furner et al.

(10) Patent No.: US 8,894,044 B2
(45) Date of Patent: Nov. 25, 2014

(54) DISPENSER

(75) Inventors: Paul E. Furner, Racine, WI (US);
Jeffrey L. Harwig, Franklin, WI (US);
William G. Parsons, Racine, WI (US)

(73) Assignee: S.C. Johnson & Son, Inc., Racine, WI (US)

( * ) Notice: Subject to any disclaimer, the term of this patent is extended or adjusted under 35 U.S.C. 154(b) by 255 days.

(21) Appl. No.: 13/588,976

(22) Filed: Aug. 17, 2012

(65) Prior Publication Data
US 2014/0047983 A1    Feb. 20, 2014

(51) Int. Cl.
*B01F 3/04*    (2006.01)

(52) U.S. Cl.
USPC ....... 261/26; 261/116; 261/DIG. 88; 239/338

(58) Field of Classification Search
USPC .................. 239/338; 261/26, 116, DIG. 88
See application file for complete search history.

(56) References Cited

U.S. PATENT DOCUMENTS

| | | | |
|---|---|---|---|
| 2,940,641 A * | 6/1960 | Norrish et al. ............... 222/183 |
| 3,330,481 A | 7/1967 | Dearling | |
| 3,369,756 A * | 2/1968 | Ramis ........................... 239/338 |
| 3,972,473 A | 8/1976 | Harrison | |
| 4,200,229 A | 4/1980 | Spector | |
| 4,235,373 A | 11/1980 | Clark | |
| 4,341,348 A | 7/1982 | Dearling | |
| 4,346,059 A | 8/1982 | Spector | |
| 4,356,969 A | 11/1982 | Obermayer et al. | |
| D274,040 S | 5/1984 | Ridgley | |
| D285,842 S | 9/1986 | Tigert | |
| D285,843 S | 9/1986 | Tigert | |
| D285,844 S | 9/1986 | Tigert | |
| 4,726,519 A | 2/1988 | Muoio | |
| 4,889,284 A | 12/1989 | Spector | |
| D309,943 S | 8/1990 | Jones et al. | |
| D309,996 S | 8/1990 | Gearing | |
| D310,021 S | 8/1990 | Anderson | |
| D318,746 S | 7/1991 | Austin | |
| D326,816 S | 6/1992 | Abrams | |
| D355,712 S | 2/1995 | Barlics | |
| D366,803 S | 2/1996 | Hauser et al. | |
| D380,641 S | 7/1997 | Randle | |
| 5,704,259 A | 1/1998 | Riehel | |
| 5,765,751 A | 6/1998 | Joshi | |

(Continued)

FOREIGN PATENT DOCUMENTS

| | | |
|---|---|---|
| BE | 790964 A2 | 3/1973 |
| DE | 2235541 A1 | 1/1974 |

(Continued)

OTHER PUBLICATIONS

PCT/US2013/055306 International Search Report dated Nov. 29, 2013.

*Primary Examiner* — Robert A Hopkins (57) ABSTRACT

Dispensing devices are disclosed that include a base, a reservoir that has a volatile active, and a housing. The housing includes a horizontal component and a vertical wall extending upwardly from the horizontal component. The horizontal component and the vertical wall define an interior volume of the housing. An activator is operatively connected to the reservoir. When the activator is activated, the volatile active is released from the reservoir into the interior volume of the housing to create a first quantity of volatile active having a first emanation rate and a second quantity of volatile active having a second emanation rate.

19 Claims, 10 Drawing Sheets

(56) References Cited

U.S. PATENT DOCUMENTS

| | | |
|---|---|---|
| 5,802,933 A | 9/1998 | Hebert et al. |
| 5,810,253 A | 9/1998 | Ohayon |
| 5,849,264 A | 12/1998 | Bassam et al. |
| 5,899,382 A | 5/1999 | Hayes et al. |
| D414,060 S | 9/1999 | Talbot-Titley |
| 6,131,488 A | 10/2000 | Coonrad |
| D437,040 S | 1/2001 | Soller et al. |
| 6,202,511 B1 | 3/2001 | Murray et al. |
| 6,250,181 B1 | 6/2001 | Coonrad |
| 6,283,337 B1 | 9/2001 | Nakamura et al. |
| 6,338,424 B2 | 1/2002 | Nakamura et al. |
| 6,360,477 B1 | 3/2002 | Flashinski et al. |
| D456,663 S | 5/2002 | Chew |
| 6,534,079 B1 | 3/2003 | Munagavalasa |
| D474,109 S | 5/2003 | Owens |
| 6,569,387 B1 | 5/2003 | Furner et al. |
| 6,610,254 B1 | 8/2003 | Furner et al. |
| 6,723,671 B2 | 4/2004 | Zolotarsky et al. |
| D489,642 S | 5/2004 | Brumlow |
| D492,600 S | 7/2004 | Moore |
| D499,796 S | 12/2004 | Walker |
| D501,248 S | 1/2005 | Chi-Hsiang et al. |
| D502,365 S | 3/2005 | Dretzka |
| D508,594 S | 8/2005 | Snell |
| 6,923,432 B1 | 8/2005 | Martinez |
| 6,957,779 B2 | 10/2005 | Joshi et al. |
| D515,682 S | 2/2006 | LaBlaine |
| 7,066,052 B2 | 6/2006 | Chen |
| 7,134,363 B2 | 11/2006 | Krallman |
| 7,137,534 B2 | 11/2006 | Patel |
| 7,149,417 B2 | 12/2006 | Joshi et al. |
| D538,992 S | 3/2007 | Snell |
| 7,234,648 B2 | 6/2007 | Tepper et al. |
| D550,509 S | 9/2007 | Dretzka |
| D557,073 S | 12/2007 | Snell |
| D561,929 S | 2/2008 | Meeker et al. |
| D565,239 S | 3/2008 | Meeker et al. |
| D565,783 S | 4/2008 | Meeker et al. |
| D573,917 S | 7/2008 | Bigoski |
| D575,899 S | 8/2008 | Meeker et al. |
| D576,759 S | 9/2008 | Meeker et al. |
| D582,724 S | 12/2008 | Dretzka |
| D588,852 S | 3/2009 | Stein |
| 7,549,598 B2 | 6/2009 | Tepper et al. |
| D596,074 S | 7/2009 | Bodum |
| D600,547 S | 9/2009 | Cain |
| 7,600,697 B2 | 10/2009 | Bankers et al. |
| D604,824 S | 11/2009 | Paolazzi et al. |
| D612,976 S | 3/2010 | Meeker et al. |
| D616,139 S | 5/2010 | Meeker et al. |
| D616,594 S | 5/2010 | Meeker et al. |
| D620,569 S | 7/2010 | Hall et al. |
| D625,460 S | 10/2010 | Boissevain |
| 7,887,759 B2 | 2/2011 | Triplett |
| D634,415 S | 3/2011 | Abbondanzio et al. |
| D638,112 S | 5/2011 | Hisey et al. |
| D639,704 S | 6/2011 | Harshman |
| 8,047,099 B2 | 11/2011 | St. John et al. |
| D651,518 S | 1/2012 | Padain et al. |
| D652,500 S | 1/2012 | Abbondanzio et al. |
| D652,661 S | 1/2012 | Lipfert et al. |
| D659,886 S | 5/2012 | Wauters |
| D660,940 S | 5/2012 | Flowers et al. |
| D667,151 S | 9/2012 | Arslanian |
| 8,261,634 B2 | 9/2012 | St. John et al. |
| D672,858 S | 12/2012 | Abbondanzio et al. |
| D673,252 S | 12/2012 | Abbondanzio et al. |
| D680,858 S | 4/2013 | Clark et al. |
| D681,299 S | 4/2013 | Lai |
| 2005/0275118 A1 | 12/2005 | Chen |
| 2006/0110297 A1 | 5/2006 | D'Amico et al. |
| 2007/0057084 A1 | 3/2007 | Vieira |
| 2007/0140924 A1 | 6/2007 | Hill |
| 2007/0187524 A1 | 8/2007 | Sherwood |
| 2008/0311008 A1 | 12/2008 | Tranzeat |
| 2009/0121041 A1 | 5/2009 | DeFlorian et al. |
| 2010/0038609 A1 | 2/2010 | Chen |
| 2010/0196195 A1 | 8/2010 | Moschel |
| 2010/0322892 A1 | 12/2010 | Burke |
| 2011/0120270 A1 | 5/2011 | Lombardi et al. |
| 2012/0091409 A1 | 4/2012 | Hanlon |
| 2012/0104027 A1 | 5/2012 | Hoppe et al. |
| 2012/0108888 A1 | 5/2012 | Spector |
| 2012/0111966 A1 | 5/2012 | Barlow et al. |
| 2012/0187217 A1 | 7/2012 | Maget et al. |

FOREIGN PATENT DOCUMENTS

| | | |
|---|---|---|
| DE | 2540075 A1 | 3/1977 |
| DE | 29816455 U1 | 11/1998 |
| EM | 000025333-0001 | 5/2003 |
| EM | 000048137-0001 | 10/2003 |
| EM | 000147632-0001 | 1/2004 |
| EM | 000146824-0003 | 6/2004 |
| EM | 000232806-0001 | 9/2004 |
| EM | 000126453-0002 | 4/2005 |
| EM | 000364054-0001 | 6/2005 |
| EM | 000364054-0003 | 6/2005 |
| EM | 000364054-0004 | 6/2005 |
| EM | 000407143-0001 | 9/2005 |
| EM | 000457510-0003 | 1/2006 |
| EM | 000601562-0003 | 9/2006 |
| EM | 000834726-0001 | 11/2007 |
| EM | 000889043-0001 | 3/2008 |
| EM | 001596388-0002 | 9/2009 |
| EM | 001660846-0006 | 3/2010 |
| EM | 001693458-0001 | 4/2010 |
| EM | 001928466-0006 | 10/2011 |
| EM | 002051540-0003 | 6/2012 |
| EM | 002079103-0001 | 7/2012 |
| EP | 1076571 A1 | 2/2001 |
| EP | 2457597 A1 | 5/2012 |
| ES | 1075670 U | 11/2011 |
| FR | 2594714 A1 | 8/1987 |
| FR | 013047-019 | 9/2001 |
| FR | 013047-023 | 9/2001 |
| FR | 013047-024 | 9/2001 |
| FR | 015603-005 | 12/2001 |
| FR | 096251-002 | 6/2010 |
| GB | 3001196 | 3/2002 |
| HU | R01936899 | 10/2011 |
| JP | H01165039 U | 11/1989 |
| JP | 2000237642 A | 9/2000 |
| JP | 2004091452 A | 3/2004 |
| JP | 2014-058455 A | 4/2014 |
| PL | 806 | 11/2003 |
| PL | 6239 | 6/2005 |
| PL | 11394 | 11/2007 |
| PL | 14495 | 1/2010 |
| WO | DM/047591 | 3/1999 |
| WO | DM/048626 | 7/1999 |
| WO | DM/052724 | 7/2000 |
| WO | DM/048560 | 8/2001 |
| WO | DM/061226 | 7/2002 |
| WO | 2002083043 | 10/2002 |
| WO | DM/062973 | 11/2002 |
| WO | 2004096588 | 11/2004 |
| WO | 2005044320 | 5/2005 |
| WO | 2006002395 | 1/2006 |
| WO | 2006105347 | 10/2006 |
| WO | 2006134353 | 12/2006 |
| WO | 2007062471 | 6/2007 |
| WO | 2008124957 | 10/2008 |
| WO | DM/073042 | 9/2009 |
| WO | DM/074638 | 9/2010 |
| WO | DM/075051 | 10/2010 |
| WO | DM/078953 | 11/2011 |
| WO | DM/077883 | 12/2011 |
| WO | DM/078938 | 2/2012 |
| WO | 2012059771 | 5/2012 |

* cited by examiner

DISPENSER

CROSS REFERENCE TO RELATED APPLICATIONS

Not applicable.

REFERENCE REGARDING FEDERALLY SPONSORED RESEARCH OR DEVELOPMENT

Not applicable.

SEQUENTIAL LISTING

Not applicable.

BACKGROUND OF THE INVENTION

1. Field of the Invention

The present invention relates generally to a dispenser for dispensing a fluid or product from a spray device, and more particularly, to an apparatus for discharging a product from a dispensing system that creates portions of the product that emanate at different rates.

2. Description of the Background of the Invention

Insecticide and/or fragrance dispensing devices are typically either active, where a composition is released from a reservoir upon activation of a release mechanism, or passive, where the composition emanates from a pre-charged substrate by passive diffusion. Each system has it advantages over the other. For example, active systems enable a user to quickly release a desired amount of an insecticide or a fragrance into the environment to repel insects or overcome a strong odor. However, these spikes in composition intensity usually decay rapidly. On the other hand, while passive systems do not have the ability to release desired amounts of a composition upon activation, they typically have a more subtle decay in the intensity of the composition compared to active systems.

Others have sought to combine active and passive systems to take advantage of the controlled release of the active systems and the sustained release of the passive systems. For example, one dispensing device dispenses a spray directly into the air and into an absorbent member. The dispensing device includes an aerosol container and an overcap disposed on a top of the aerosol container. The overcap includes a vented cylindrical sidewall and a vented top portion. A plunger element engages a valve stem on the container and extends through the top portion of the overcap. The plunger includes two ports formed on opposing sides thereof. Two absorbent carrier members are disposed within an upper portion of the overcap around the plunger element. The carrier members are substantially semicircular in cross-section and are spaced around the plunger in such a way as to create two diametrically opposing passageways. Upon activation of the plunger element; fragrance is released out of the ports and through the opposing passageways into the atmosphere. The overcap may also be turned 90 degrees so that the ports and passageways do not align, such that when the plunger is activated spray is released out of the ports directly into the carrier elements. Additional ports may be provided in the plunger so that the spray can be released through the passageways and onto the carrier members simultaneously.

Another device simultaneously sprays an air-treating composition into the air for instant air treatment and recharging an absorbent element for effective continuous air treatment. The device includes an overcap for an aerosol container that includes a cylindrical vented wall and an actuator button with a passageway in communication with a valve stem of the aerosol container. The absorbent member is disposed within the overcap. When the device is activated, the air-treating composition passes a plurality of outlets formed in the passageway before being discharged through a spray orifice and into the air. The plurality of outlets direct a portion of the air-treating composition onto the absorbent member for subsequent passive treatment of the air. A preferred embodiment includes four outlets spaced at 90 degree intervals around the passageway. Alternatively, the outlets could be formed in the valve stem of the aerosol container instead of in the passageway.

Similarly, an additional vapor dispensing device includes multiple delivery mechanisms for fragrance release. The dispensing device includes a continuous delivery mechanism with an emanator in communication with a reservoir, for delivering a first continuous passive release of fragrance. The dispensing device also includes an on-demand delivery mechanism for delivering an instantaneous burst of fragrance. Additionally, activation of the on-demand delivery mechanism produces a second continuous passive release of fragrance by depositing a portion of the fragrance burst onto the continuous delivery mechanism or a second surface. The combination of the first and second passive releases creates a release of fragrance that is of a higher intensity than the fragrance released by the continuous delivery mechanism alone.

However, none of these dual systems recognizes the advantages of the current system that uses the relationship between the active delivery of a composition and the passive emanator surface to create an insecticide (or other volatile active) dispensing system with multiple emanation rates for a single composition.

SUMMARY OF THE INVENTION

According to one aspect, a dispensing device includes a base, a reservoir disposed within the base and comprising a volatile active, and a housing disposed on the base. The housing comprises a horizontal component and a vertical wall extending upwardly from the horizontal component. The horizontal component and the vertical wall define an interior volume of the housing. An activator is operatively connected to the reservoir. When the activator is activated, the volatile active is released from the reservoir into the interior volume of the housing to create a first quantity of volatile active having a first emanation rate and a second quantity of volatile active having a second emanation rate.

According to another aspect, a dispensing device includes a base, a reservoir disposed within the base and comprising a volatile active, and a housing disposed on the base. The housing comprises a horizontal component and a vertical wall extending upwardly from the horizontal component. The horizontal component and the vertical wall define an interior volume of the housing. An activator operatively connects the housing to the reservoir. Displacement of the housing upon application of pressure thereto releases the volatile active from the reservoir into the interior volume to create a first quantity of volatile active having a first emanation rate and a second quantity of volatile active having a second emanation rate.

According to a further aspect, a dispensing device includes a base, a reservoir disposed within the base and comprising a volatile active, and a housing disposed on the base. The housing comprises a horizontal component and a vertical wall extending upwardly from the horizontal component. The horizontal component and the vertical wall define an interior volume of the housing. An activator is operatively connected to the reservoir. When the activator is activated, the volatile active is released from the reservoir into the interior volume of the housing to create a first quantity of the volatile active having a first emanation rate, a second quantity of the volatile active having a second emanation rate, and a third quantity of the volatile active having a third emanation rate.

DETAILED DESCRIPTION

The present disclosure is directed toward dispensers for dispensing volatile active-containing compositions. The dispensers described herein may be used as stand alone dispenser devices, which may be placed on a table, shelf or other flat surface. With reference to FIGS. 1-5, one particular embodiment of a dispenser 10 is illustrated that includes a base 12 and a housing 14 disposed on the base. The housing 14 includes a horizontal component 16 and a vertical wall 18 that extends upwardly from the horizontal component 16. The housing 14 may be capped by a lid 20 disposed at a top edge 22 of the vertical wall 18. The vertical wall 18 may be removably or permanently secured to the housing 14, for example, by snap fit detents (not shown) or other means as are known in the art. The lid 20 may be similarly secured to the vertical wall 18. In one embodiment, the vertical wall 18 and lid 20 are a monolithic structure. Alternatively, the vertical wall 18 may simply rest atop the housing 14, and the lid 20 may also rest atop the vertical wall.

Figure 3:
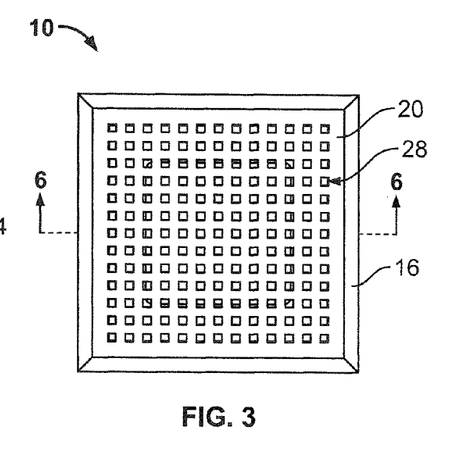
FIG. 3 is a top plan view of the dispenser of FIG. 1.
Figure 4:
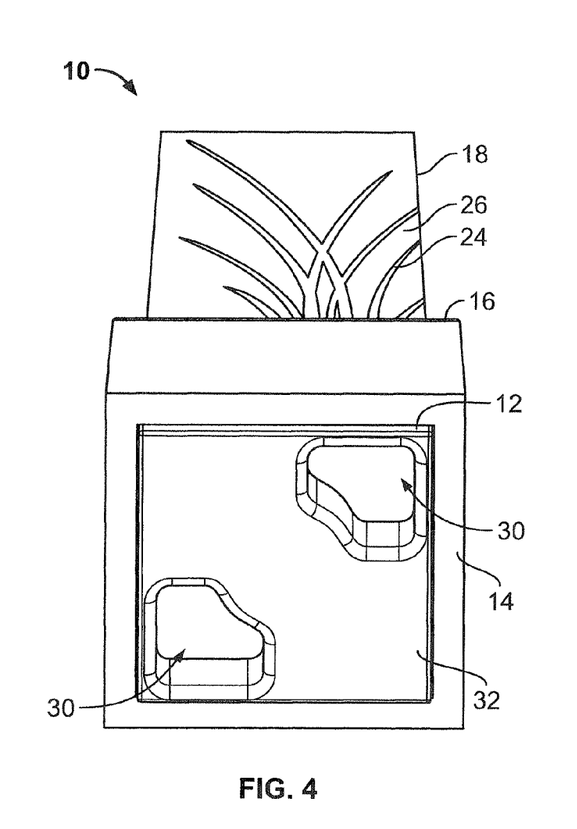
FIG. 4 is a bottom perspective view of the dispenser of FIG. 1.

The dispenser 10 may have a generally square shape when viewed from above or below, as seen in FIGS. 3 and 4, respectively, but may also be circular, elliptical, triangular, or any other shape. The base 12 and housing 14 may be constructed from any suitable material, such as a plastic, a polymer, a fabric, a non-woven substrate, such as a PET non-woven substrate, a cellulosic material, a metal, glass, wood, stone, rock, or combinations thereof. Additionally, the materials may include combinations of manufactured, natural, and recycled or reclaimed materials. In some cases, the materials are selected from, or include manufactured materials configured to approximate naturally occurring substances, such as wood, stone, paper, rock, or combinations thereof Any such materials can be selected based upon their having a natural looking appearance and/or a natural feeling to the touch. By incorporating natural materials, or analogs of natural materials, the dispenser 10 can be made to look more appropriate for placement in an outdoors location, such as in a sun room or on a porch, balcony, or patio, or can complement the look and feel of existing natural objects within the home.

Figure 1:
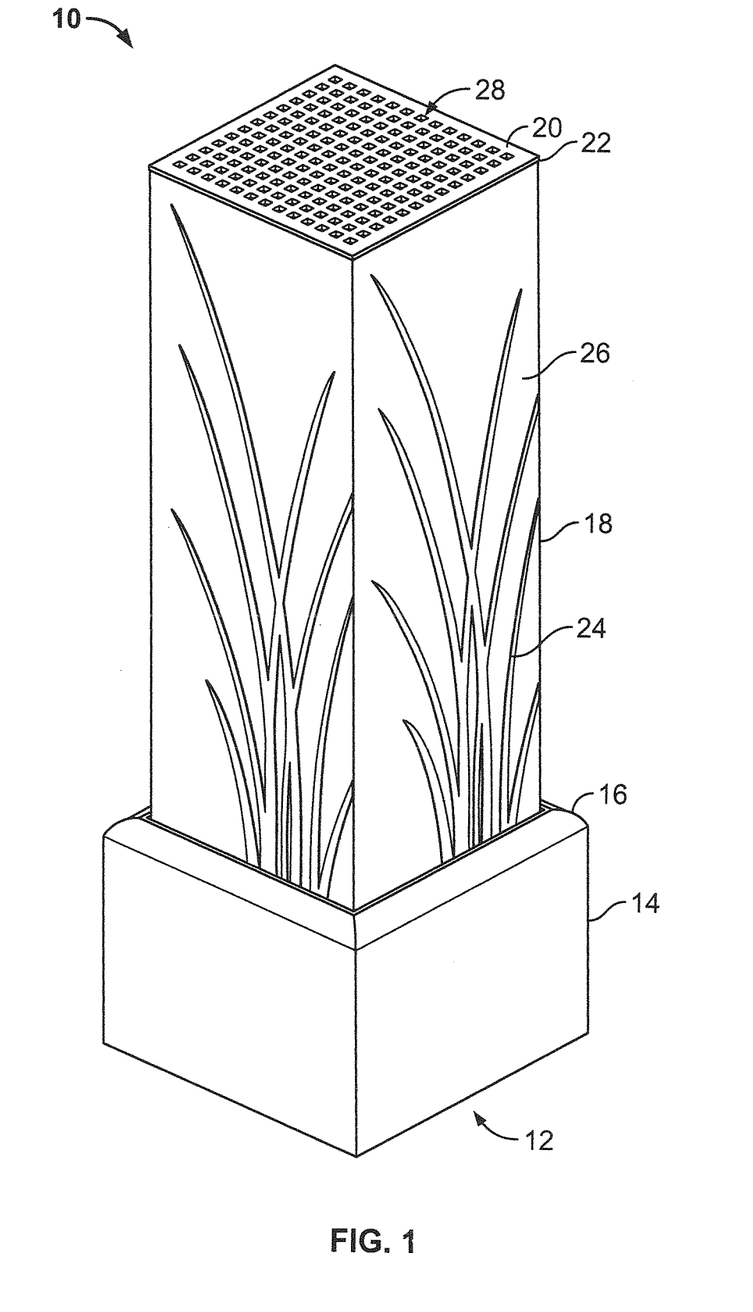
FIG. 1 is an isometric view of a dispenser according to a first embodiment.
Figure 2:
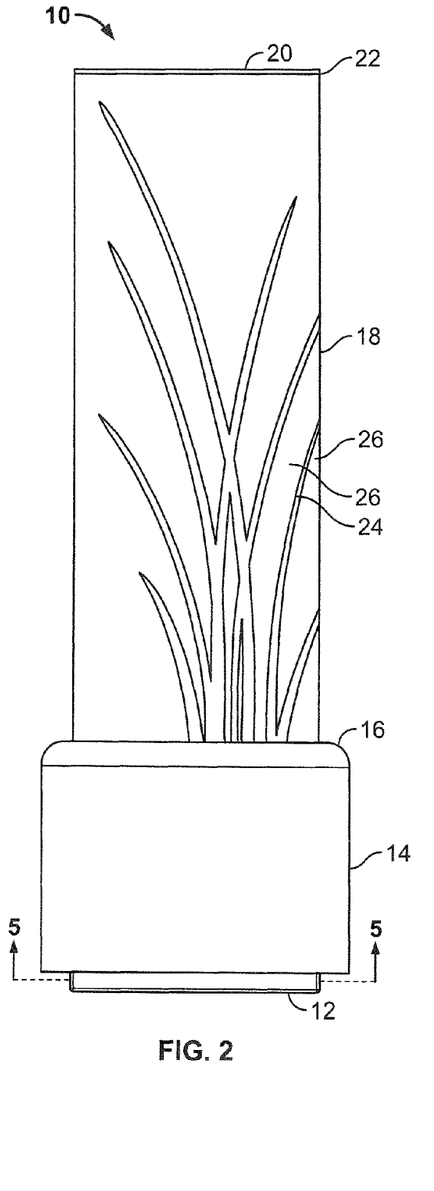
FIG. 2 is a front elevational view of the dispenser of FIG. 1, the left, right, and rear elevational views being substantially the same as FIG. 2.

In one embodiment, the vertical wall 18 may be constructed in whole or in part of a volatile active-permeable material, such as a PET non-woven material or other permeable material. As shown in FIGS. 1 and 2, the vertical wall 18 may include a pattern 24. The pattern 24 may be constructed of the permeable material and a portion 26 of the wall surrounding the pattern may be constructed from the same or another material. The pattern 24 may also be formed by apertures through the vertical wall 18 in the shape of the pattern 24. In this case, the permeable material may partially or completely span the apertures.

The lid 20 of the dispenser 10 may be constructed of the same or similar material as the vertical wall 18 to provide a uniform appearance. Alternatively, the lid 20 may be formed of a different material. In the embodiment shown in FIG. 3, the lid 20 has a grid-like configuration containing apertures 28 therethrough. In other embodiments, the lid 20 may have a mesh, screen or woven configuration that approximates the porosity of a grid-like configuration. In one embodiment, the vertical wall 18 and lid 20 are formed of a rigid material to enable a user to grasp the dispenser 10 by the vertical wall without causing its collapse.

Figure 5:
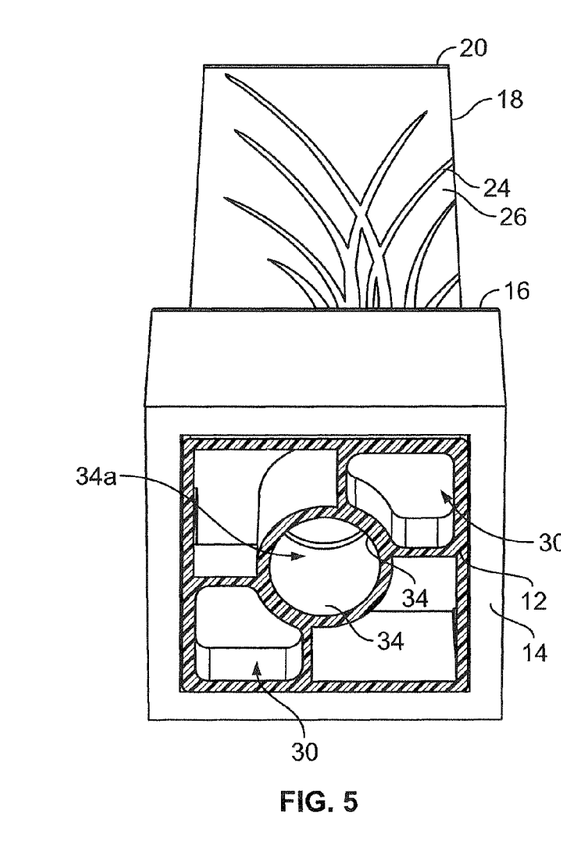
FIG. 5 is a bottom, partial sectional, perspective view of the dispenser of FIG. 1 taken substantially along line 5-5 of FIG. 2.
Figure 6:
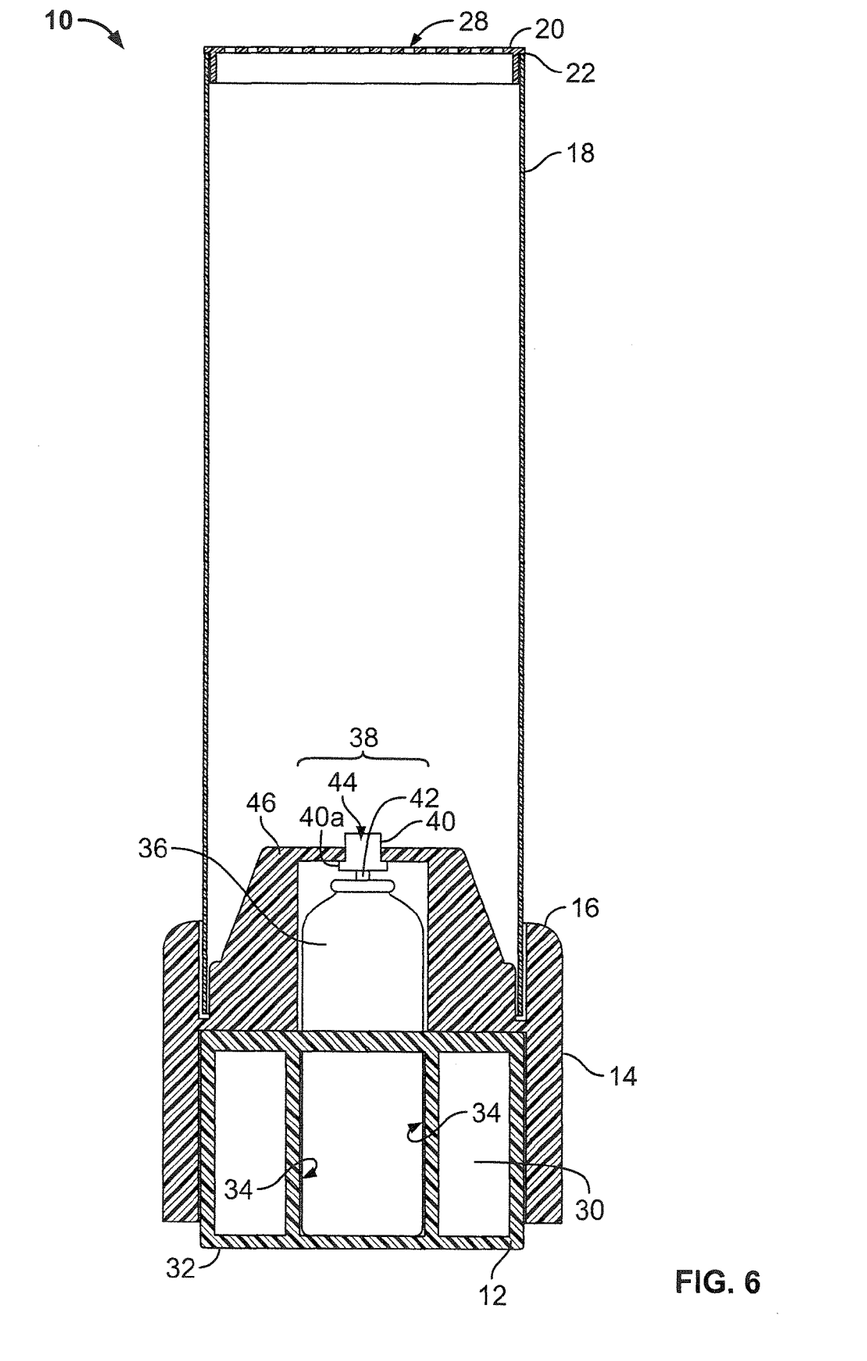
FIG. 6 is a partial sectional view of the dispenser of FIG. 1 taken substantially along line 6-6 of FIG. 3.

As is seen in FIGS. 4 and 5, the base 12 includes indentations 30 that extend upwardly from a bottom surface 32 of the base with arcuate portions 34 facing the center of the base to form a cylindrical recess 34a in the base. Seen more clearly in FIG. 5, which has had the bottom surface 32 of the base 12 removed for clarity, the cylindrical recess 34a serves to retain a reservoir 36, such as an aerosol or pump spray container within the base of the dispenser 10 (see FIG. 6). Additional or alternate means for securing the reservoir 36 in place, as known to those of skill in the art, are also contemplated. The dispenser 10 may be partially disassembled by lifting the housing 14 off of the base 12. In this way, a user may place and replace the reservoir 36 within the base.

The dispenser 10 is configured to discharge a composition from the reservoir 36 upon the occurrence of a particular condition. In the present embodiment, the condition is the manual activation of the dispenser 10 by way of an activator 38, which may include a push button 40 with a collar 40a seated upon a valve stem 42 of the reservoir 36. The push button 40 extends through an aperture 44 in a central portion 46 of the housing 14, such that a lower surface 48 of the central portion rests atop an upper surface 50 of the collar 40a (seen in FIG. 6A). In this way, the weight of the housing 14 rests upon the collar 40a, and a spring (not shown) contained within a valve assembly (not shown) supports the housing above the base 12. Therefore, the exertion of a downward force on the housing 14 (and/or vertical all 18), for example, by grasping the housing or pressing down on the horizontal component 16 of the housing forces the push button 40 downward. Such downward movement is brought about by the central portion 46 of the housing interacting with the push button 40 to counteract the spring within the valve assembly and to open the valve and release the composition from the reservoir 36. The housing 14 returns to its original position upon release of the downward force by means of the spring. Additional means for supporting the weight of the housing and returning same to a pre-operative position are also envisioned in a manner known to the art.

An advantage to activating the dispenser 10 in the present embodiment is that a user may release the composition from the reservoir 36 while minimizing direct exposure to the composition, as the user need not place her hand on the push button 40. In addition, the combination of the relatively tall vertical wall 18 and apertures 28 within the lid 20 further minimizes direct exposure to a user upon release of the composition by directing the composition vertically as well as restricting the amount of composition emitted directly into the immediate environment.

Figure 6A:
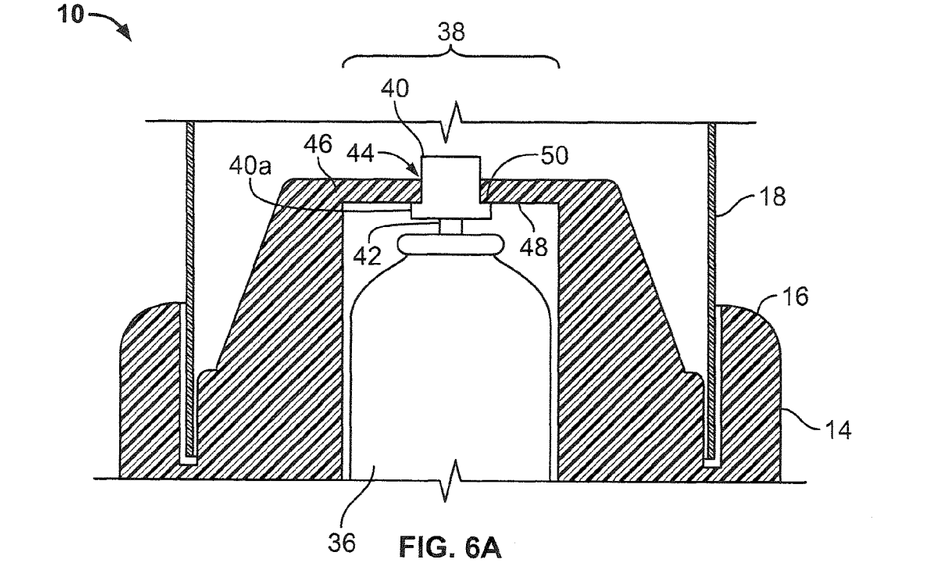
FIG. 6A is an enlarged partial sectional view of a central portion of the dispenser of FIG. 1 taken substantially along line 6-6 of FIG. 3.
Figure 6B:
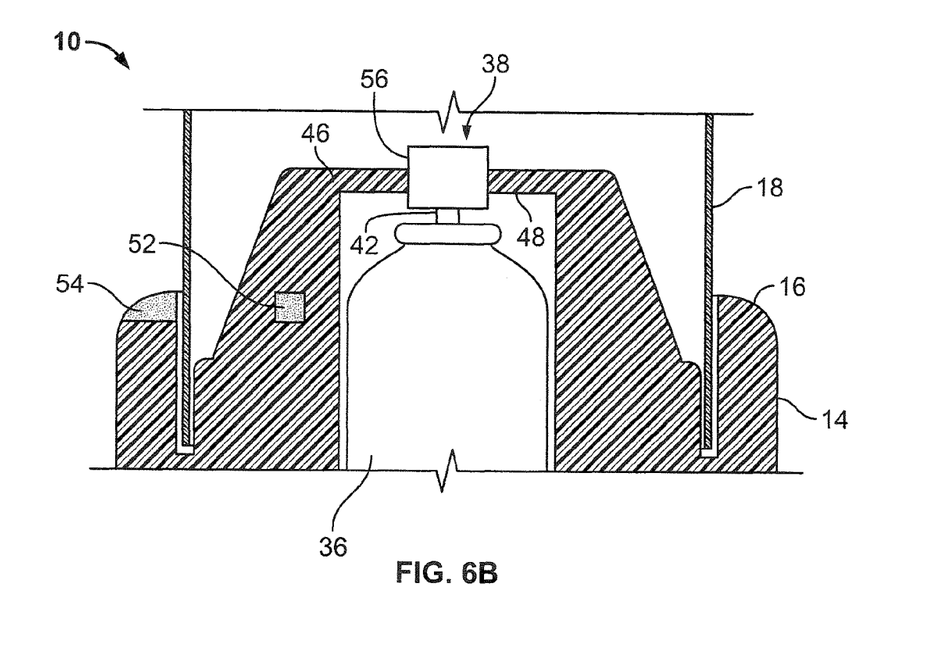
FIG. 6B is an enlarged partial sectional view of the central portion of the dispenser of FIG. 1 taken substantially along line 6-6 of FIG. 3.

In another embodiment illustrated in FIG. 6B, the activator 38 may include additional and/or alternate mechanisms to release the volatile active-containing composition from the reservoir 36. In this embodiment, the activator 38 may include a mechanical and/or electromechanical system that activates the dispenser 10 in response to an elapsed time interval determined by a timer 52 and/or a signal from a sensor 54, such as a motion sensor or other type of sensor. In one implementation, a sensor 54 may be a light-sensing element, such as a photodetector, or may be a sound detecting element, such as a microphone. in this embodiment, the dispenser 10 may be activated, for example, by entry of the user into a room where the dispenser has been placed. In this case, the sensor 54 detects the entry of the user, which then triggers activation of the activator 38 to release a metered dose of the composition from the reservoir 36. In one embodiment, the activator 38 may incorporate a solenoid 56 powered by batteries (not shown) that releases the metered dose of the composition.

Figure 7:
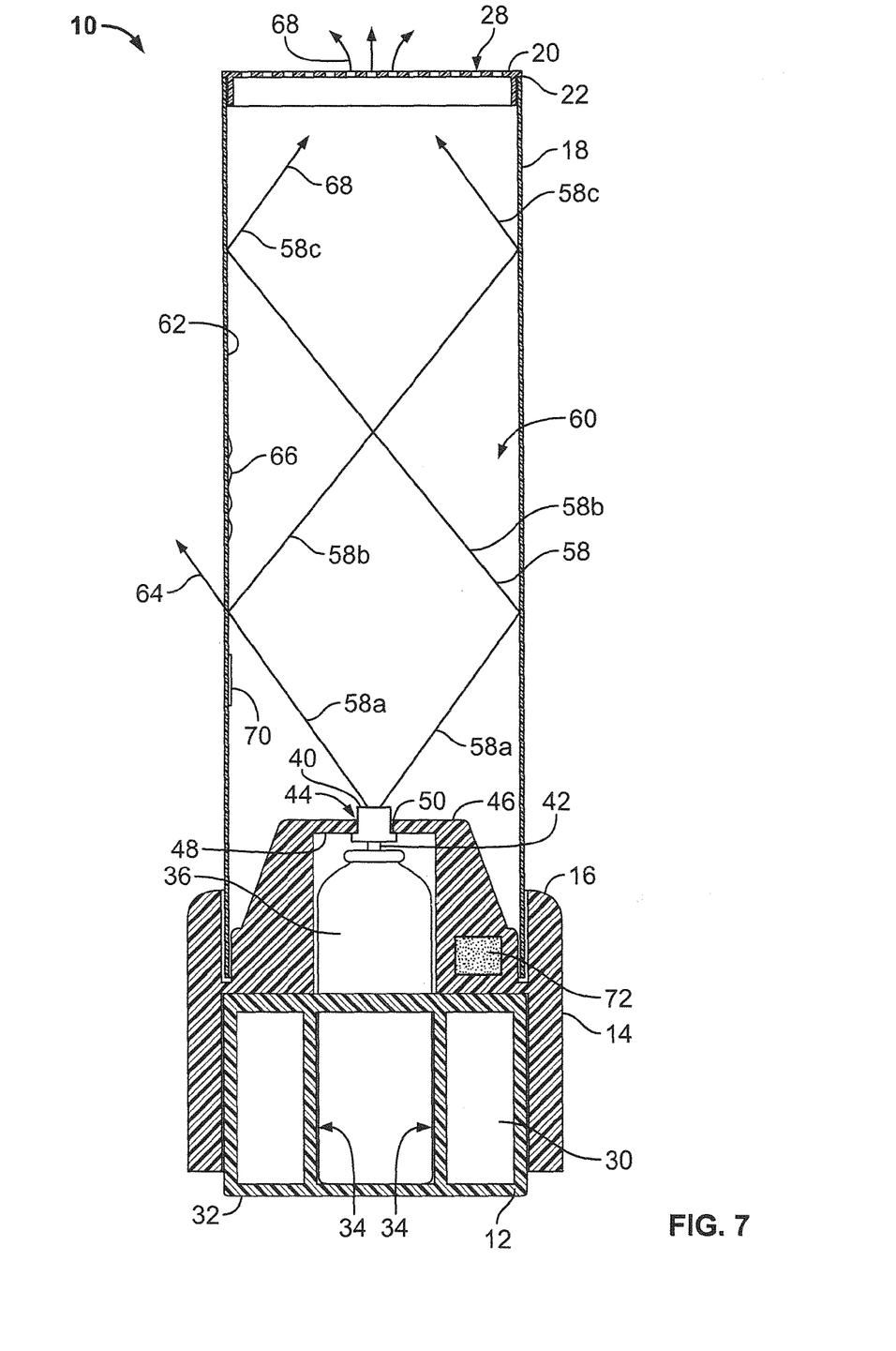
FIG. 7 is a partial sectional view of another embodiment of a dispenser taken substantially along line 6-6 of FIG. 3.

As illustrated in FIG. 7, upon activation of the activator 38, a stream 58 of the composition held within the reservoir 36 is released into an interior volume 60 of the housing 14. The stream 58 may have a spray pattern that results in, for example, primary 58a. secondary 58b, and tertiary 58c vectors due to deflections off of the interior surface 62 of the vertical wall 18. Indeed, any number of deflections may occur. Upon release, a first quantity 64 of the stream 58 formed of small particles of the composition may exit through the vertical wall 18 directly to create an immediate effect on the surrounding environment. A second quantity 66 of the stream 58 may be deposited on the inner surface 62 of the vertical wall 18 and may permeate through the vertical wall immediately and/or over time to passively emanate from the vertical wall. A third quantity 68 of composition created by deflection of the stream 58 off of the interior surface 62 may exit the dispenser 10 through apertures 28 in the lid 20. In this way, the dispenser 10 creates multiple quantities of composition with multiple emanation rates due to the interaction with the vertical wall 18 and/or the lid 20.

In one embodiment, it is contemplated that the first quantity 64 emanates immediately upon activation of the dispenser 10. Subsequently, the second quantity 66 is emanated through the vertical wall 18. The third quantity 68 may emanate through the apertures 28. In various embodiments, either of the second 64 or the third 68 quantities may be emanated first or contemporaneously for all or a portion of its emanation period. Further, the interior surface 62 may have various textures and/or surface patterns, such as a rough surface, a smooth surface, a channeled surface, and combinations thereof that may effect deflection angles that, in turn, may effect the amount of deposition on the interior surface as well as the amount of composition deflected from the interior surface. Further, increasing or decreasing the velocity of the stream 58 and/or providing some type of metering device may assist in varying the amounts of composition distributed into the first, second, and third quantities 64, 66, and 68, respectively.

The reservoir 36 may be an aerosol container, pump-type sprayer, and the like. Additional examples of reservoirs, activation mechanisms, compositions, substrates, and the like that may be used herein include those disclosed in U.S. Pat. Nos. 7,837,065, 8,061,562, and U.S. patent application Ser. Nos. 11/801,554, 11/893,456, 11/893,489, 11/893,476, 11/805,976, 11/893,532, and 12/804,872. The composition dispensed may include a fragrance, an insecticide, a deodorizer, a fungicide, a bacteriocide, a sanitizer, a pet barrier, or other active volatile or other compound disposed within a carrier liquid (for example, an oil-based and/or water-based carrier), a deodorizing liquid, or the like. Examples of possible insecticides include metafluthrin and transfluthrin, among others.

Additional examples of the composition include OUST™, an air and carpet sanitizer for household. commercial, and institutional use, or GLADE®, a household deodorant, both sold by S.C. Johnson and Son. Inc., of Racine, Wis. The fluid may also comprise other actives, such as sanitizers, air and/or fabric fresheners, cleaners, odor eliminators, mold or mildew inhibitors, insect repellents, and the like, or others that have aromatherapeutic properties. The fluid alternatively comprises any fluid known to those skilled in the art that can be dispensed from a container, such as those suitable for dispersal in the form of particles or droplets suspended within a gas and/or propelled by means of a propellant. The dispenser 10 is therefore adapted to dispense any number of different fluid or product formulations.

Additional features contemplated herein include use-up indicators or use cues. For example, in one embodiment where the volatile active is dispensed onto the inner surface 62 of the vertical wall 18 of the housing 14, an ink 70 is provided within the vertical wall or the composition that may appear or disappear to indicate when the volatile active has completely evaporated from the walls of the housing. Combinations of appearing and disappearing inks are contemplated to create more complex features upon the application and gradual emanation of the volatile active from the dispenser 10. Other use-up cues could be employed, including, for example, a liquid/gel vessel that is peeled to activate, capillary action or absorption of inks that begins upon activation by peeling or pressing together with an absorbent layer, a dial to set date, or an area to write the date when activated, etc.

In another embodiment, the dispenser 10 may incorporate a mechanism 72 to augment emanation rates such as a heater and/or a fan or other means as are known in the art.

Figure 8:
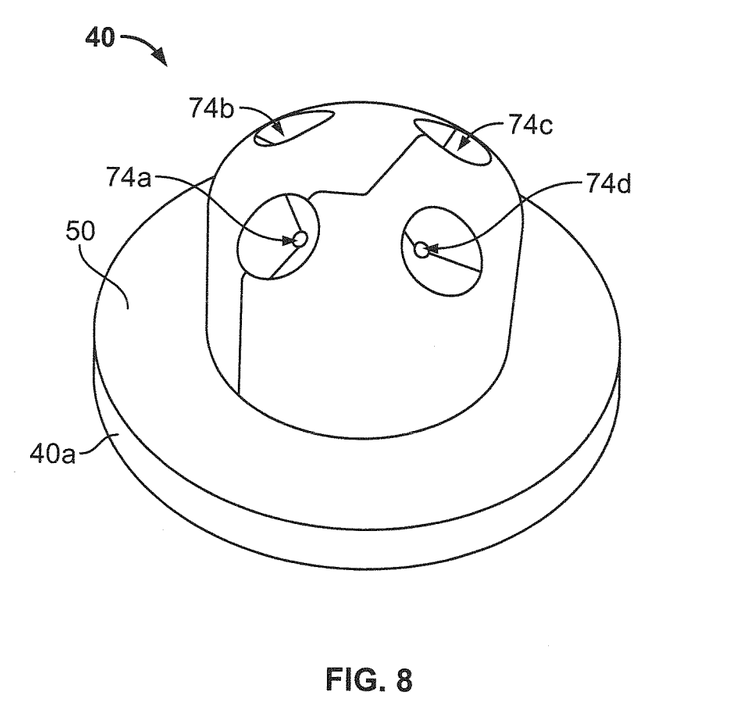
FIG. 8 is a front perspective view of a nozzle according to one embodiment.

In a further embodiment depicted in FIG. 8, the push button 40 comprises multiple apertures 74a-d that split the composition as it exits from the reservoir 36 into a plurality of streams. In this embodiment, four apertures 74a-d are depicted; however, fewer or more apertures are envisioned, for example, 2, 3, or 6. The apertures 74a-d may be oriented on the push button 40 to aim the resulting streams in any direction. For example, the streams may be aimed directly at the facing vertical wall 18 or as otherwise desired to modify an angle of impact of the streams against the vertical wall.

Further, in this embodiment the apertures 74a-d may angle the dispersion of the stream to prevent or limit a trajectory 90° from horizontal. For example, the stream may be about 20° to about 45° or greater (or lesser) from vertical.

Figure 9:
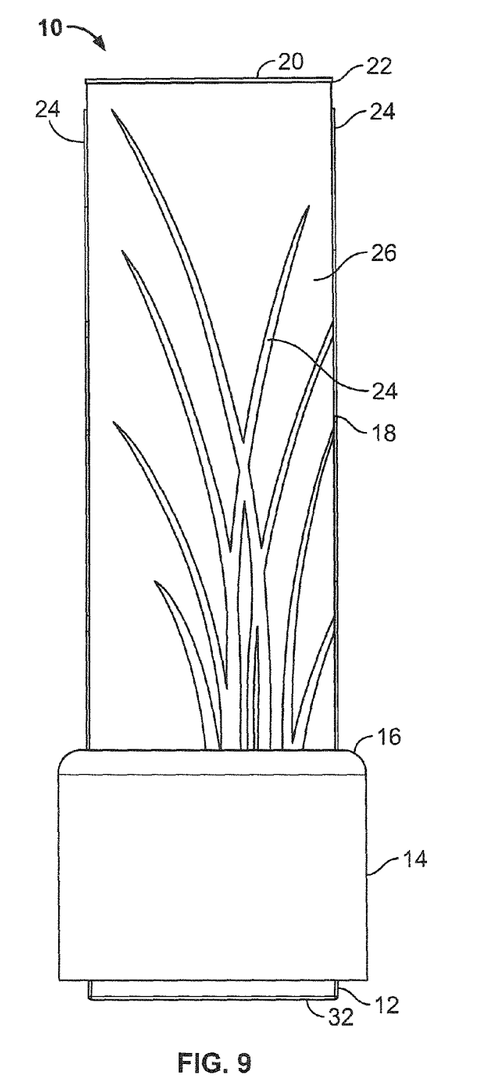
FIG. 9 is a front elevational view of a dispenser according to another embodiment.

In a further embodiment illustrated in FIG. 9, the pattern 24 on the vertical wall 18 forms a raised surface with respect to the portion 26 of the wall surrounding the pattern. In this embodiment, the pattern 24 may increase the capacity of the vertical wall 18 to absorb composition applied thereto due to the increased thickness of the wall. Further, the pattern 24 may be applied separately to the vertical wall 18 or formed by embossing the vertical wall in a desired pattern.

Figure 10:
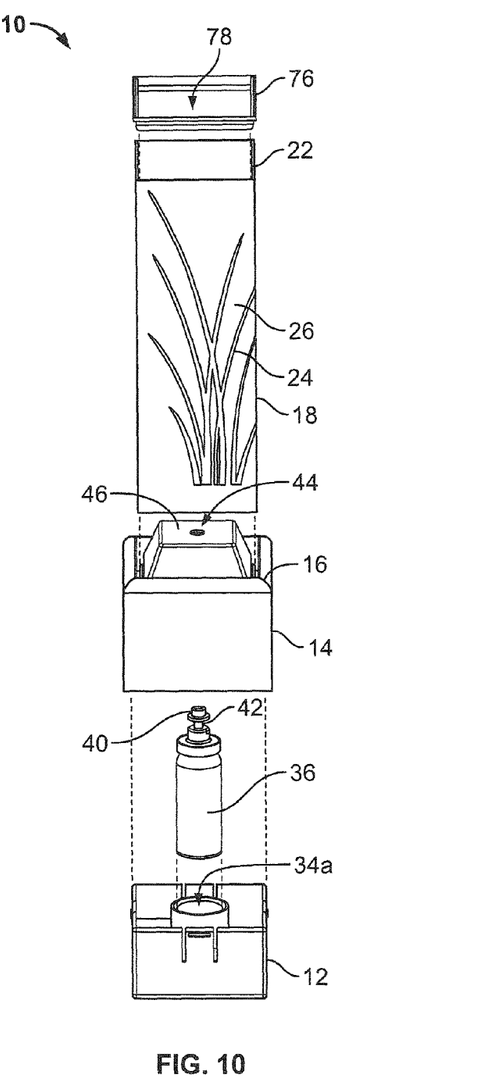
FIG. 10 is an exploded view of a dispenser according to a further embodiment.

Another embodiment depicted in FIG. 10 illustrates a dispenser 10 that uses a collar 76 in place of a lid 20. When assembled with the vertical wall 18, the collar 76 rests atop the top surface 22 of the vertical wall. A central aperture 78 of the collar 76 enables unimpeded emanation of the composition out of the top of the vertical wall 18, while the collar adds rigidity to the structural integrity of the vertical wall. Alternatively, additional variants of the lid 20 are envisioned including lids of different sizes, lids with different sized and/or different numbers of apertures, such as 1 or 6 or 36, and lids without any apertures at all.

Figure 11:
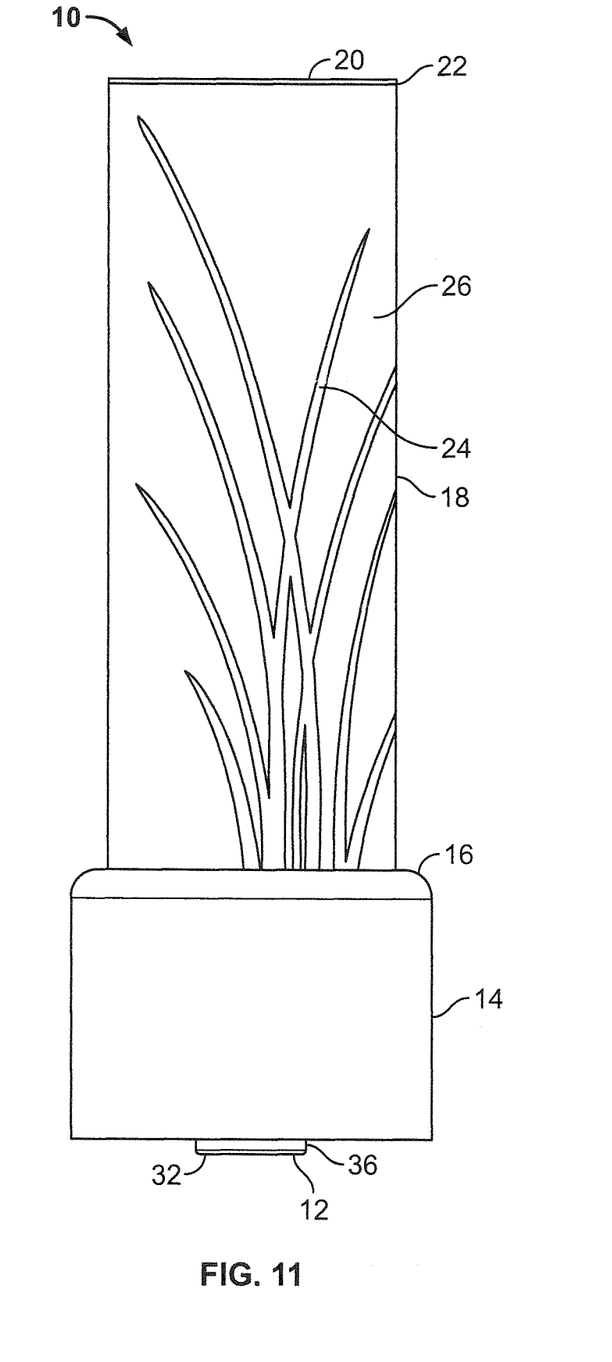
FIG. 11 is a front elevational view of a dispenser according to a further embodiment.

In a further embodiment shown in FIG. 11, the base 12 may comprise a lower portion of the reservoir 36. In this embodiment, the housing 14 rests on the reservoir 36 as shown in FIG. 6A, which, in turn, rests on a surface.

Figure 12:
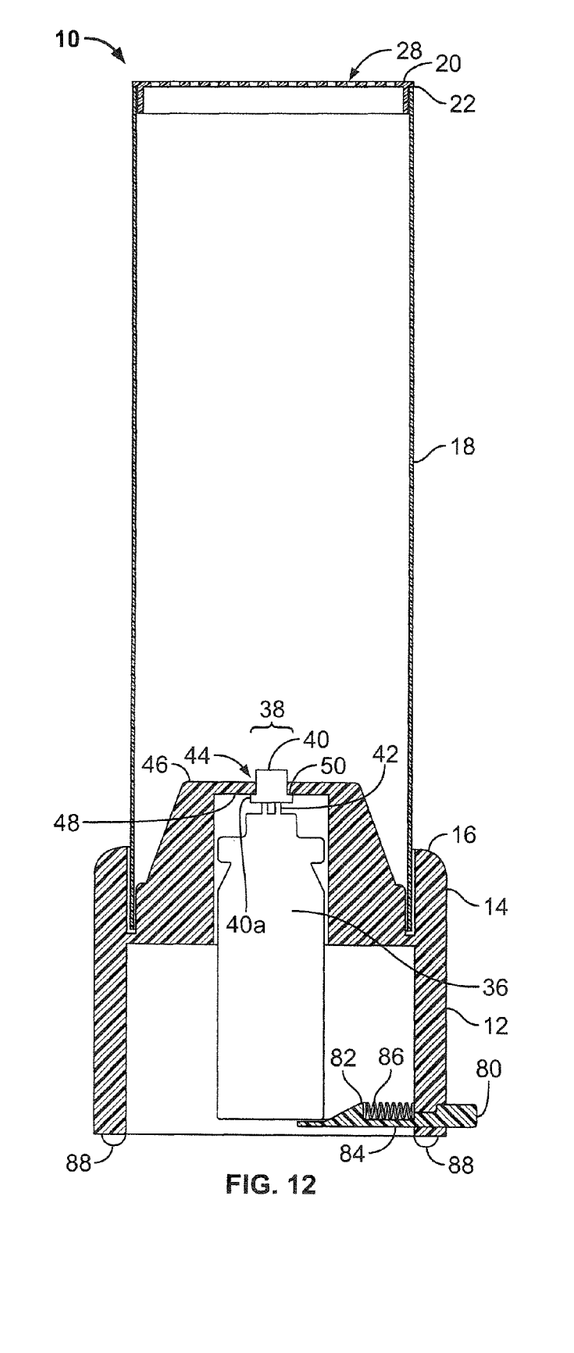
FIG. 12 is a partial sectional view of another embodiment of a dispenser taken substantially along line 6-6 of FIG. 3.

In another embodiment, the base 12 and the housing 14 may be integral and/or monolithic, as shown in FIG. 12. In this embodiment, rather than the housing 14 moving downward to release the composition from the reservoir 36, an alternative mechanism is used. Here, an external button 80 is operatively connected to a ramp 82 by a connector 84 that runs beneath the reservoir 36. In use, a user depresses the external button 80, which causes the ramp 82 to be forced under the reservoir 36 by the connector 84 thereby pushing the reservoir upward and depressing the valve stem 42 to release the composition. A spring 86 or similar device causes the external button 80 to revert to its pre-operative position. In a similar embodiment (not shown), a tilt valve may be used. In this case, the connector 84 impinges on the reservoir 36 from the side to cause lateral movement when the external button 80 is depressed.

In the embodiment of FIG. 12, the external button 80 and the connector 84 may also serve to retain the reservoir 36 within the dispenser 10. In use, the external button 80 may be pulled outwardly from the base 12 to retract the connector 84 and allow the reservoir 36 to be inserted or removed from the dispenser 10. Afterwards, the spring 86 causes the connector 84 to revert to its pre-operative position beneath the reservoir 36. This embodiment may further include feet 88 for placement of the dispenser 10 on a surface.

Figure 13:
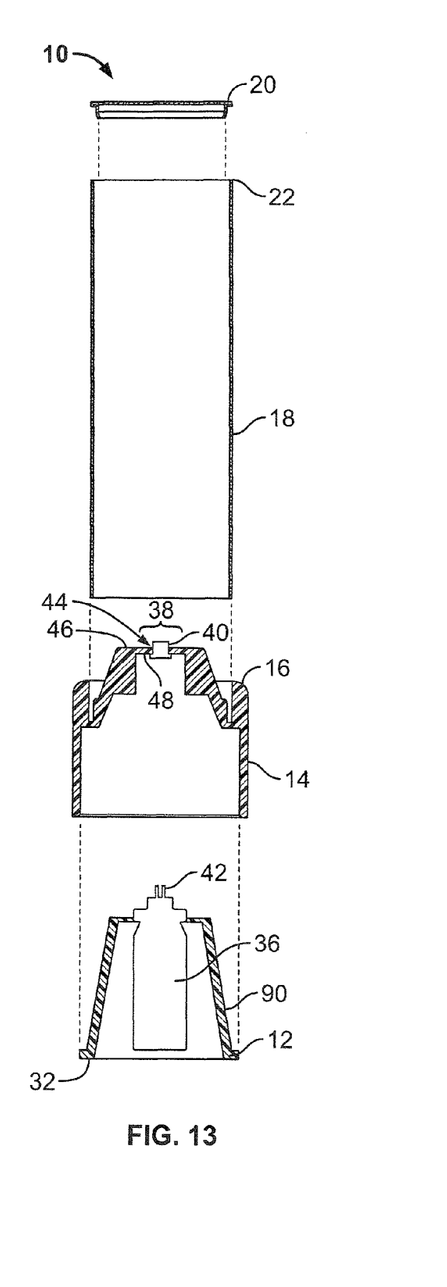
FIG. 13 is an exploded partial sectional view of a dispenser according to a further embodiment.

In a further embodiment shown in FIG. 13, the reservoir 36 may be inserted into a holder 90, which in turn is inserted into the housing 14. In this embodiment, the holder 90 comprises the base 12 of the dispenser 10. The reservoir 36 may be retained within the holder 90 by means known in the art, such as snap fit detents (not shown) or a friction fit, The holder 90, in turn, may be retained within the housing 14 by similar means or other means as known in the art.

All documents cited in the Detailed Description of the Invention are, in relevant part, incorporated herein by reference; the citation of any document is not to be construed as an admission that it is prior art with respect to the present invention.

INDUSTRIAL APPLICABILITY

Numerous modifications to the present invention will be apparent to those skilled in the art in view of the foregoing description. Accordingly, this description is to be construed as illustrative only and is presented for the purpose of enabling those skilled in the art to make and use the invention and to teach the best mode of carrying out same. The exclusive rights to all modifications which come within the scope of the appended claims are reserved.

What is claimed is:

1. A dispensing device, comprising:
   a base;
   a reservoir disposed within the base and comprising a volatile active;
   a housing disposed on the base, the housing comprising a horizontal component and a vertical wall extending upwardly from the horizontal component, the horizontal component and the vertical wall defining an interior volume of the housing; and
   an activator operatively connected to the reservoir,
   wherein the vertical wall comprises a substrate permeable to the volatile active, and
   wherein when the activator is activated, the volatile active is released from the reservoir into the interior volume of the housing to create a first quantity of volatile active having a first emanation rate and a second quantity of volatile active having a second emanation rate.

2. The dispensing device of claim 1, wherein the reservoir comprises an aerosol container or a pump-type sprayer.

3. The dispensing device of claim 1, wherein the volatile active is selected from the group consisting of a fragrance, insecticide, a deodorizer, a fungicide, a bacteriocide, a sanitizer, a pet barrier, and combinations thereof.

4. The dispensing device of claim 1, wherein the volatile active comprises an insecticide.

5. The dispensing device of claim 1, wherein at least one of the base or the housing comprises a plastic, a polymer, a fabric, a nonwoven, a cellulosic material, a metal, glass, a manufactured material, a natural material, a recycled material, a reclaimed material, wood, stone, rock, or combinations thereof.

6. The dispensing device of claim 1, wherein the housing further comprises a lid.

7. The dispensing device of claim 6, wherein the lid comprises a porous structure.

8. The dispensing device of claim 7, wherein the lid is disposed at a top edge of the vertical wall.

9. The dispensing device of claim 1, wherein the activator comprises a sensor-activated mechanical or electromechanical system.

10. The dispensing device of claim 9, wherein the sensor comprises a photodetector, photodiode light detector, a photoresistor, a photodiode, a phototransistor, a microphone, a passive infra-red sensor, or combinations thereof.

11. The dispensing device of claim 9, wherein the electromechanical system comprises a solenoid.

12. The dispensing device of claim 1, wherein the activator comprises a timer-activated mechanical or electromechanical system.

13. The dispensing device of claim 1 further comprising at least one of a fan or a heater, wherein the at least one of a fan or a heater is activated upon release of the volatile active.

14. A dispensing device, comprising:
   a base;
   a reservoir disposed within the base and comprising a volatile active;
   a housing disposed on the base, the housing comprising a horizontal component and a vertical wall extending upwardly from the horizontal component, the horizontal component and the vertical wall defining an interior volume of the housing; and an activator operatively connecting the housing to the reservoir, wherein downward displacement of the housing releases the volatile active from the reservoir into the interior volume to create a first quantity of volatile active having a first emanation rate and a second quantity of volatile active having a second emanation rate.

15. The dispensing device of claim 14, wherein the activator comprises a push button disposed within the horizontal component.

16. The dispensing device of claim 15, wherein the push button comprises a plurality of apertures.

17. A dispensing device, comprising:
a base;
a reservoir disposed within the base and comprising a volatile active;
a housing disposed on the base, the housing comprising a horizontal component and a vertical wall extending upwardly from the horizontal component, the horizontal component and the vertical wall defining an interior volume of the housing; and an activator operatively connected to the reservoir, wherein the vertical wall comprises a substrate permeable to the volatile active, and wherein when the activator is activated, the volatile active is released from the reservoir into the interior volume of the housing to create a first quantity of the volatile active having a first emanation rate, a second quantity of the volatile active having a second emanation rate, and a third quantity of the volatile active having a third emanation rate.

18. The dispensing device of claim 17 further comprising a use cue.

19. The dispensing device of claim 18, wherein the use cue comprises a re-appearing ink, a disappearing ink, or combinations thereof.

* * * * *